(12) United States Patent
Vernia (10) Patent No.: US 10,243,808 B2
(45) Date of Patent: Mar. 26, 2019

(54) USER INTERFACE FOR MODIFYING ROWS ASSOCIATED WITH VIRTUAL MACHINES

(71) Applicant: Red Hat Israel, Ltd., Raanana (IL)

(72) Inventor: Lior Vernia, Tel-Aviv (IL)

(73) Assignee: Red Hat Israel, Ltd., Raanana (IL)

( * ) Notice: Subject to any disclaimer, the term of this patent is extended or adjusted under 35 U.S.C. 154(b) by 283 days.

(21) Appl. No.: 14/188,526

(22) Filed: Feb. 24, 2014

(65) Prior Publication Data

US 2015/0244584 A1   Aug. 27, 2015

(51) Int. Cl.
*G06F 9/455* (2018.01)
*G06F 3/048* (2013.01)
*H04L 12/24* (2006.01)
*G06F 3/0484* (2013.01)
*G06F 3/0482* (2013.01)

(52) U.S. Cl.
CPC ............ *H04L 41/22* (2013.01); *G06F 3/0482* (2013.01); *G06F 3/04842* (2013.01); *G06F 3/04847* (2013.01); *G06F 9/455* (2013.01); *G06F 9/45533* (2013.01)

(58) Field of Classification Search
None
See application file for complete search history.

(56) References Cited

U.S. PATENT DOCUMENTS

| | | | |
|---|---|---|---|
| 6,525,721 B1 * | 2/2003 | Thomas | G06F 3/0481 345/594 |
| 7,840,601 B2 * | 11/2010 | Bicker | G06F 17/245 707/791 |
| 8,365,144 B1 | 1/2013 | Webb | |
| 8,464,173 B2 | 6/2013 | Victor | |
| 8,564,544 B2 * | 10/2013 | Jobs | G06F 3/0488 345/173 |
| 2009/0282404 A1 * | 11/2009 | Khandekar | G06F 9/45558 718/1 |
| 2009/0288084 A1 * | 11/2009 | Astete | G06F 9/45533 718/1 |
| 2010/0017801 A1 * | 1/2010 | Kundapur | G06F 9/45558 718/1 |
| 2012/0072910 A1 * | 3/2012 | Martin | G06F 9/45533 718/1 |
| 2013/0054426 A1 * | 2/2013 | Rowland | G06F 9/5011 705/27.2 |

(Continued)

OTHER PUBLICATIONS

Freevo V4 Designing Forms, 2013.*

(Continued)

*Primary Examiner* — Jennifer N To
*Assistant Examiner* — Beau D Spratt
(74) *Attorney, Agent, or Firm* — Lowenstein Sandler LLP (57) ABSTRACT

A graphical user interface may be provided. In some embodiments, the graphical user interface may include a plurality of rows. A first row may include a first entry field and a first visual indicator and a second row may include a second entry field and a second visual indicator. The first entry field may be assigned a first profile. A selection of a second profile for the second entry field may be received and a selection of the second visual indicator may be received. A third row may be added in response to the selection of the second visual indicator after the selection of the second profile to be assigned to the second entry field.

14 Claims, 8 Drawing Sheets

(56) References Cited

U.S. PATENT DOCUMENTS

| | | | |
|---|---|---|---|
| 2013/0145310 A1 | 6/2013 | Forstall et al. | |
| 2013/0332387 A1 | 12/2013 | Mirra et al. | |
| 2014/0108139 A1* | 4/2014 | Weinstein | G06Q 30/02 |
| | | | 705/14.53 |
| 2014/0223431 A1* | 8/2014 | Yoshimura | G06F 9/45558 |
| | | | 718/1 |
| 2015/0188775 A1* | 7/2015 | Van Der Walt | G06F 3/0481 |
| | | | 715/734 |

OTHER PUBLICATIONS iPhone Learn Objective C, 2010.*
FOSS-Cloud User Guide 1.0, 2012.*
Oracle "PeopleTools PeopleBook", 2011, pp. 279,611,284,299 https://docs.oracle.com/cd/E25741_01/psft/acrobat/pt852tapd-b1011.pdf.*
"Remove Row From Flextable in GWT," Published Jul. 12, 2013, http://stackoverflow.com/questions/11415652/remove-row-from-flextable-in-gwt.
Rao, "Re: [Engine-devel] GUI Widget for Adding/Removing Entries," Published Oct. 9, 2013, http://www.mail-archive.com/engine-devel@ovirt.org/msg05153.html.
"Remove User Selected Rows from a QTableWidget," Published Mar. 26, 2013, http://qt-project.org/forums/viewthread/26126.
"Deleting Certain Rows/Columns in a Grid Tkinter," Published Jul. 6, 2013, http://stackoverflow.com/questions/11357988/deleting-certain-rows-columns-in-a-grid-tkinter.

* cited by examiner

USER INTERFACE FOR MODIFYING ROWS ASSOCIATED WITH VIRTUAL MACHINES

TECHNICAL FIELD

Aspects of the disclosure relate generally to a user interface and, more specifically, relate to a user interface for adding and removing rows associated with virtual machines.

BACKGROUND

A virtual machine (VM) may be considered a software-based emulation of computer hardware. For example, the virtual machine may operate based on computer architecture and functions of the computer hardware resources. Thus, the virtual machine may emulate a physical computing environment, but requests for CPU, memory, hard disk, network, and other hardware resources may be managed by a virtualization layer which translates these requests to the underlying physical hardware resources.

A user may configure aspects of a virtual machine. For example, the user may configure the virtualized hardware resources of the virtual machine.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Embodiments of the disclosure provide a row module to add and/or remove rows in a graphical user interface associated with a virtual machine (VM). A virtual machine may emulate a physical computing environment by virtualizing hardware resources. For example, the virtual machine may include a virtual processor, virtual memory, a virtual network interface card, etc. A user of the virtual machine may assign profiles to the virtualized hardware resources. In some embodiments, a profile may specify characteristics or settings of the virtualized hardware resource for the virtual machine.

A user may utilize a graphical user interface to configure virtualized hardware resources of a virtual machine and to assign profiles to the virtualized hardware resources. For example, the user may add or remove virtual network interfaces (e.g., virtual network interface cards) that are part of the virtual machine and may further assign profiles to the virtual network interfaces.

In some embodiments, a graphical user interface may include rows that correspond to the virtualized hardware resources such as virtual network interfaces. Each row may be added or removed to effectively add or remove a virtual network interface for the virtual machine. However, adding or removing the rows of the graphical user interface (GUI) may require attention from the user to a different portion of the graphical user interface than the portion of the graphical user interface that displays the rows. As such, the workflow of the user may be negatively impacted as the user switches between making entries and/or selections within the rows of the graphical user interface and adding and/or removing rows of the graphical user interface as the user will need to switch between the various portions of the graphical user interface.

In order to address the issue with a graphical user interface negatively impacting the workflow of a user, a row module may generate and provide a type of graphical user interface to be displayed for a user that may facilitate user workflow when modifying entries of virtualized hardware resources. For example, visual indicators may be generated to be placed adjacent to the rows such that when the visual indicators are selected (e.g., clicked) by a user, a row may be added or removed from the graphical user interface.

Figure 1:
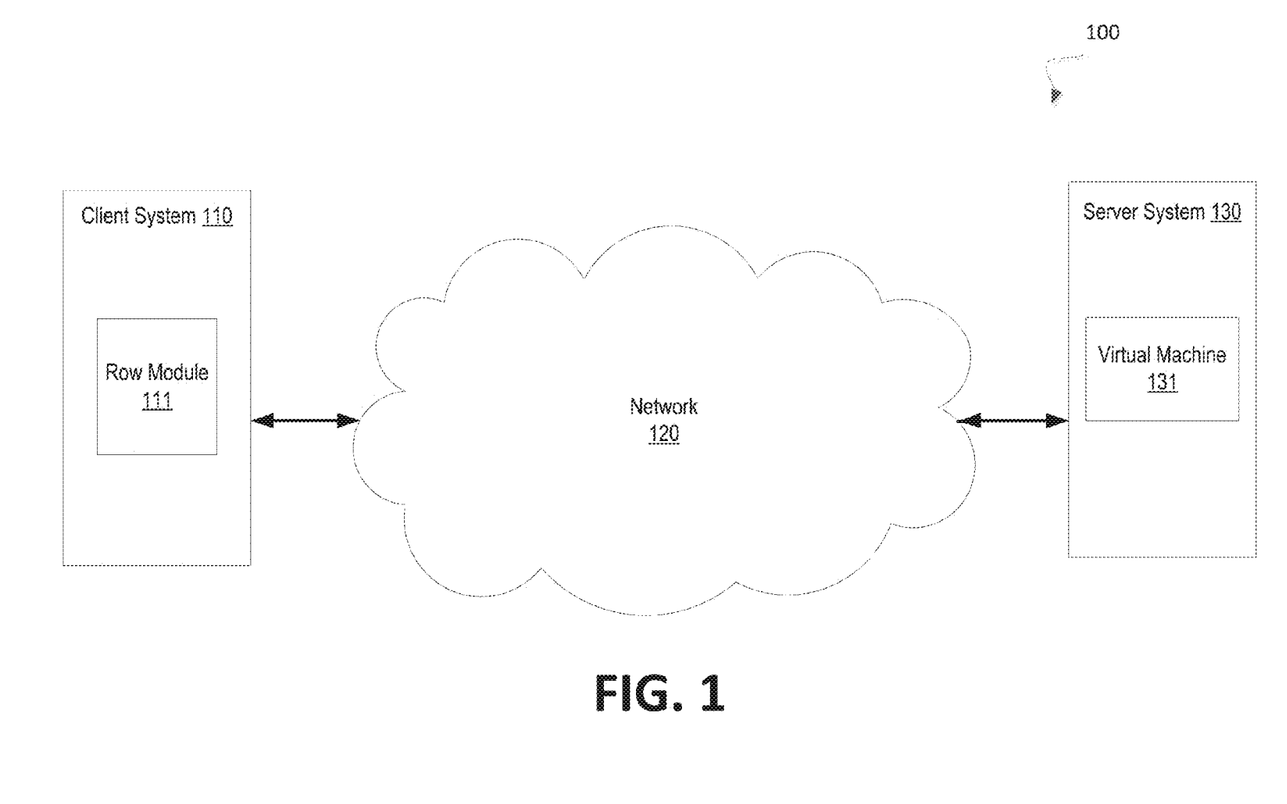
FIG. 1 illustrates an example system architecture in which embodiments of the disclosure may operate.

FIG. 1 is an example system architecture 100 for various implementations of the disclosure. The system architecture 100 may include a server system 130 and a client system 110 that are coupled via a network 120. The network 120 may be a public network (e.g., the Internet), a private network (e.g., a local area network (LAN) or a wide area network (WAN)), or a combination thereof. Network 120 may include a wireless infrastructure, which may be provided by one or multiple wireless communications systems, such as a wireless fidelity (WiFi) hotspot connected with the network 120 and/or a wireless carrier system that may be implemented using various data processing equipment, communication towers, etc.

Server system 130 may be a computing device (e.g., a server machine, a router, personal computer, etc.) that may host one or more virtual machines 131. In some embodiments, the virtual machine is an independent instance of an operating system and associated software and information. The server system 130 may provide the hardware that provides computing resources such as processing power, memory, disk and network I/O (input/output), and so on that may be virtualized. A virtual machine monitor (VMM) or hypervisor intermediates between the server system 130 and virtual machine, isolating individual virtual machines from one another and making it possible for the server system 130 to support multiple virtual machines running different operating systems. A virtual machine may exist on a single physical machine (e.g., server system 130) but may also be distributed across multiple server systems. A virtual machine may similarly exist as part of the resources of a single server system 130 or as smaller parts of the resources of multiple server systems.

Client system 110 may be any computing device (e.g., a server machine, a router, a personal computer, a mobile device, etc) that may represent a user device or a server which can be, for example, a host controller managing multiple virtual machines hosted by different host servers 130 in a data center. Furthermore, the client system 110 may remotely access the virtual machine 131 over the network 120. For example, a user (e.g., a system administrator) of the client system (e.g., host controller) 110 may configure virtual devices of the virtual machine 131 by using a row module 111 that may be used to assign profiles to virtual hardware resources of the virtual machine 131. In some embodiments, the row module 111 may be used by a user of the client system 110 to assign profiles to virtual network interfaces for the virtual machine 131. Although not shown, in some embodiments, the row module 111 may be part of the server system 130. For example, in some embodiments, the graphical user interface to add and/or remove rows may be provided to the client system 110 by the server system 130.

Figure 2:
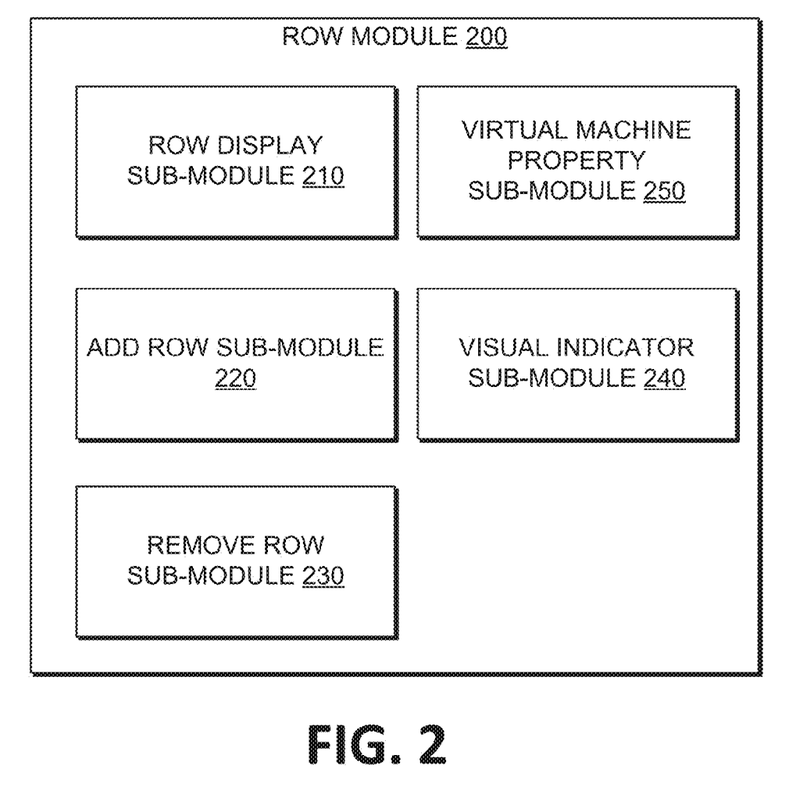
FIG. 2 is a block diagram of an example row module in accordance with some embodiments of the disclosure.

FIG. 2 illustrates an example row module 200 in accordance with some embodiments of the disclosure. In general, the row module 200 may correspond to the row module 111 of FIG. 1. The row module 200 may include a row display sub-module 210, an add row sub-module 220, a remove row sub-module 230, a visual indicator sub-module 240, and a virtual machine property sub-module 250. In alternative embodiments, the functionality of one or more of the sub-modules may be combined or divided.

As shown in FIG. 2, the row module 200 may include a row display sub-module 210. In some embodiments, the row display sub-module 210 may display one or more rows. In the same or alternative embodiments, the row display sub-module 210 may display one or more rows corresponding to a virtual machine. For example, the row display sub-module 210 may display or provide one or more rows where each row represents a virtual device or a virtual hardware resource (e.g., a virtual network interface) of the virtual machine. The row module 200 may further include a visual indicator sub-module 240. In some embodiments, the visual indicator sub-module 240 may display or provide a visual indicator for each row displayed or provided by the row display sub-module 210. In the same or alternative embodiments, the visual indicators that are displayed or provided may be used to add a new row or to remove an existing row. Further details with regard to the visual indicators are discussed in further detail below with regard to FIGS. 3-6.

The row module 200 may further include an add row sub-module 220 and a remove row sub-module 230. In some embodiments, the add row sub-module 220 may add a new row to be displayed or provided by the row display sub-module 210 in response to a selection or activation of a visual indicator. For example, the add row sub-module 220 may add a new row for a user to add a virtual hardware resource (e.g., a virtual network interface) and to assign a profile to the virtual hardware resource of the virtual machine. Furthermore, the remove row sub-module 230 may remove an existing row that is displayed or provided by the row display sub-module 210. For example, the remove row sub-module 230 may remove an existing row that corresponds to a virtual hardware resource of a virtual machine. In some embodiments, the removing of a row may remove a virtual network interface that is associated with the virtual machine.

Returning to FIG. 2, the row module 200 may include a virtual machine property sub-module 250. In some embodiments, the virtual machine property sub-module 250 may assign a property or a profile to a virtual hardware resource (e.g., a virtual network interface) of a virtual machine based on or in view of the rows that have been added and any assigning of properties or profiles to the rows as discussed in further detail below.

Figure 3:
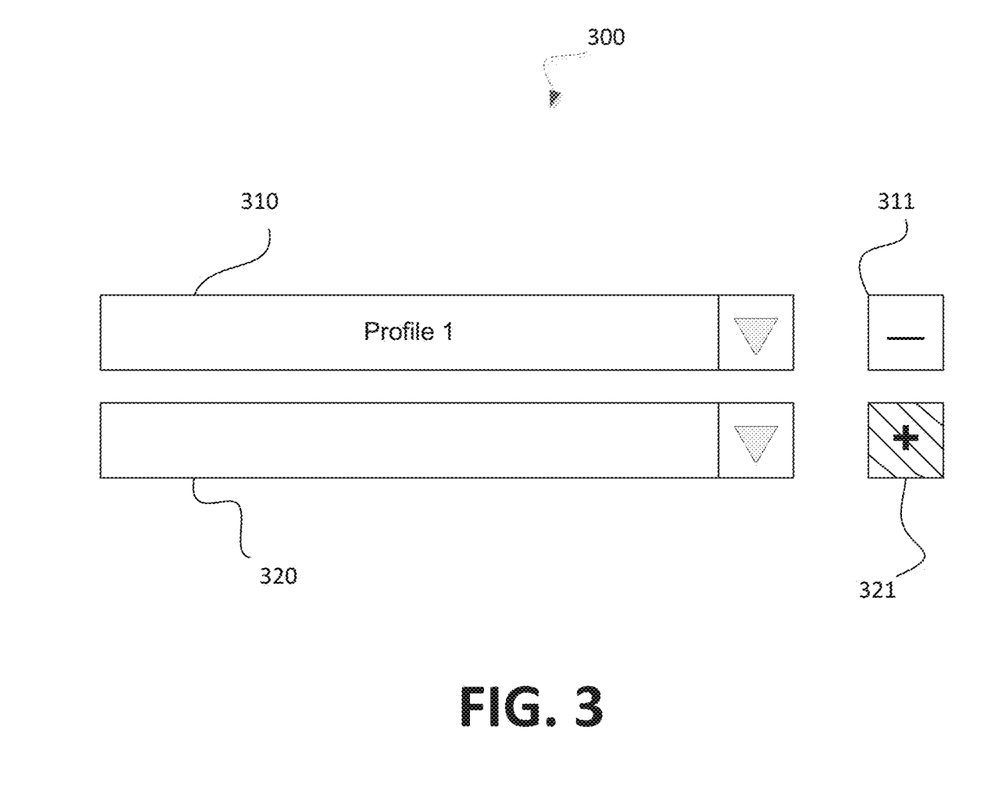
FIG. 3 is an illustration of an example graphical user interface in accordance with some embodiments.

FIG. 3 illustrates an example graphical user interface 300 in accordance with some embodiments. The graphical user interface 300 may be provided by processing logic that may comprise hardware (e.g., processing device, circuitry, dedicated logic, programmable logic, microcode, etc.), software (e.g., instructions run or executed on a processing device), or a combination thereof. In some embodiments, the graphical user interface 300 may be displayed or provided by a row module 200 of a client system or of a server system.

As shown in FIG. 3, the graphical user interface 300 may include rows 310 and 320. As an example, the rows 310 and 320 of the graphical user interface 300 correspond to virtual network interfaces of a virtual machine (e.g., virtual machine 131). However, the rows 310 and 320 of the graphical user interface 300 may correspond to any type of component or virtual hardware resource of a virtual machine or be part of any type of graphical user interface that is not associated with virtual machines.

The graphical user interface 300 may include a row 310 that includes an entry field 312 and a row 320 that includes an entry field 322. In some embodiments, the graphical user interface 300 may display the row 310 to indicate that the virtual machine associated with the graphical user interface 300 has one virtual network interface assigned to it. For example, as shown, the entry field of the row 310 has been assigned a profile. In some embodiments, an entry field of a row with an assigned profile may be referred to as an active or enabled row or entry field. Furthermore, the entry field 322 of the row 320 may not have an assigned profile. In some embodiments, a row with an entry field that does not have an assigned profile may be referred to as an inactive or disabled row or entry field. Furthermore, each row 310 and 320 may be associated with or include a visual indicator. For example, the row 310 may include a visual indicator 311 that is adjacent to the entry field 312 and the row 320 may include a visual indicator 321 that is adjacent to the entry field 322. In some embodiments, the visual indicator 311 may be immediately to the right of the entry field 312 and the visual indicator 121 may be immediately to the right of the entry field 322. In some embodiments, the visual indicators may be assigned one of a first state, second state, or a third state. For example, an active or enabled row may be assigned a visual indicator of a first state (e.g., a minus sign) that indicates that the active or enabled row may be removed if a user selects the visual indicator that is in the first state (e.g., minus sign). Furthermore, the visual indicator 321 may be in the second state (e.g., grayed out or a disabled plus sign). In some embodiments, the visual indicator 321 in the second state (e.g., a disabled plus sign) may not be selected by a user.

As such, the graphical user interface 300 may include rows corresponding to virtual network interfaces for a virtual machine. In some embodiments, if one virtual network interface is associated with the virtual machine, the graphical user interface 300 may display an active row and a disabled row below the active row. Each of the rows may include an entry field and an adjacent visual indicator.

Figure 4:
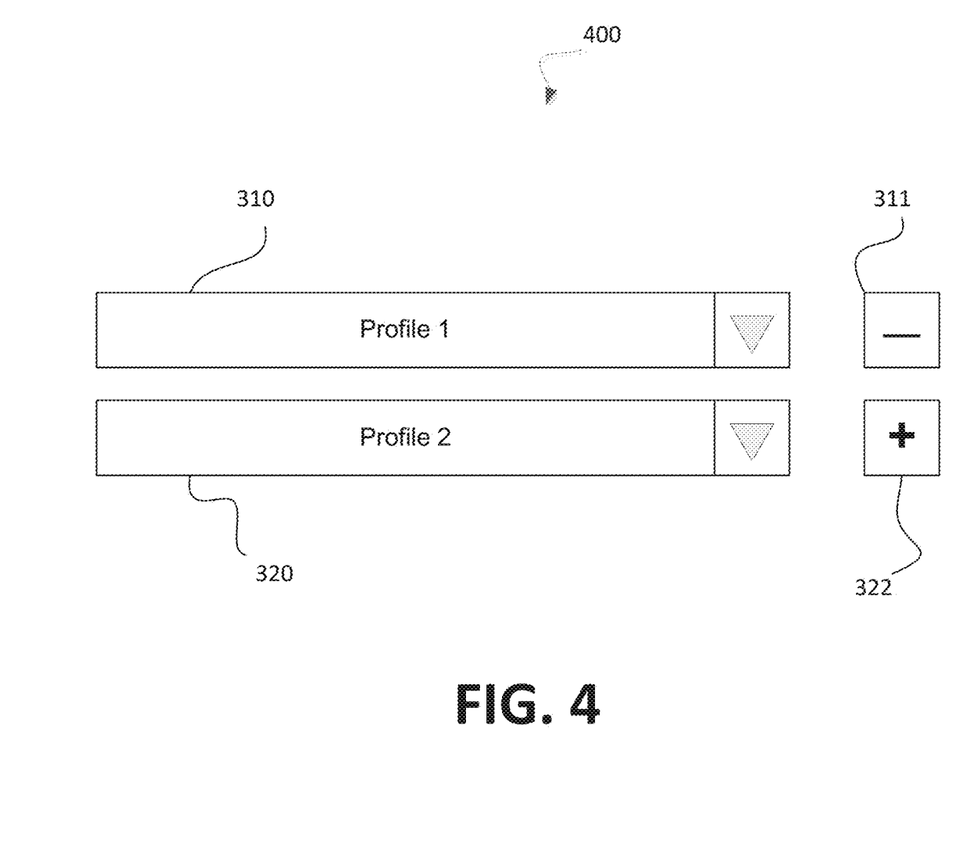
FIG. 4 is an illustrated example of a row of the graphical user interface being activated in accordance with some embodiments of the disclosure.

FIG. 4 is an illustrated example of a row of a graphical user interface 400 being activated in accordance with some embodiments of the disclosure. The graphical user interface 400 may be provided by processing logic that may comprise hardware (e.g., processing device, circuitry, dedicated logic, programmable logic, microcode, etc.), software (e.g., instructions run or executed on a processing device), or a combination thereof. In some embodiments, the graphical user interface 400 may be displayed or provided by a row module 200 of a client system or of a server system.

Furthermore, the graphical user interface 400 may correspond to the graphical user interface 300 after a user has activated a row or entry field of the graphical user interface 300.

As shown in FIG. 4, the graphical user interface 400 includes the row 310 with the entry field 312 and visual indicator 311 and the row 320 with an entry field 325 and visual indicator 322. In some embodiments, the row 320 of the graphical user interface 400 has been activated by a user selecting the entry field 325 and assigning a profile to the entry field 325. For example, the entry field 325 may be a drop down menu with a list of available profiles (e.g., profiles of virtual network interfaces for a virtual machine). If a user has selected a profile for the entry field 325 of the row 320, then the row 320 may be considered to be activated. In response to the row 320 being activated, the visual indicator for the row 320 may be changed from the second state (e.g., the grayed out plus sign of visual indicator 321) to a third state (e.g., an active plus sign that may be selected or activated by a user).

Figure 5:
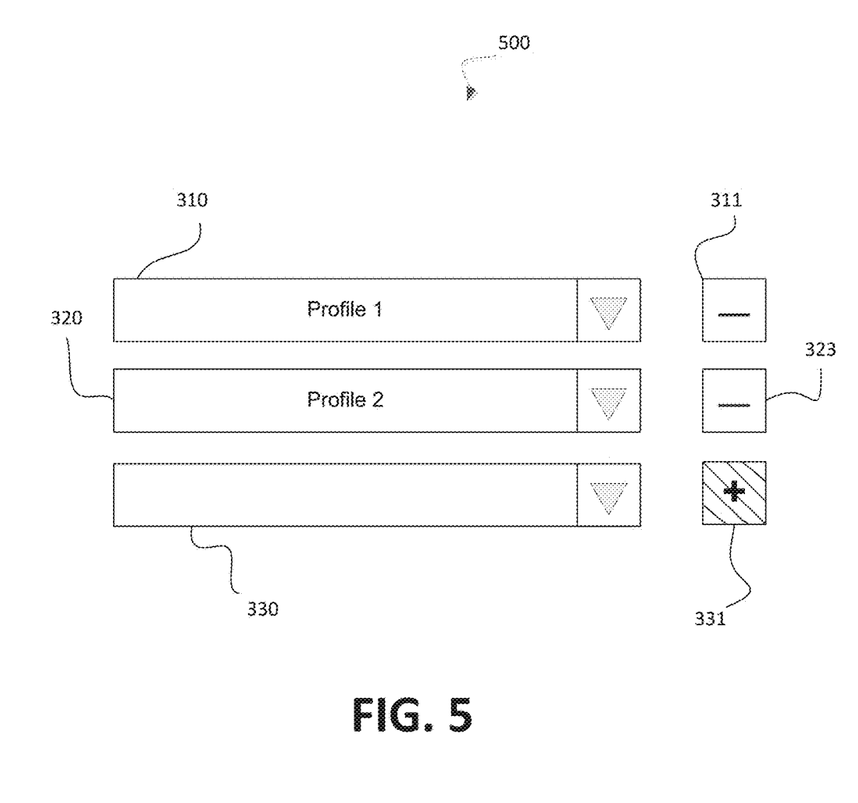
FIG. 5 is an illustrated example of graphical user interface with an added row in accordance with some embodiments.

FIG. 5 is an illustrated example of a row of a graphical user interface 500 being added in accordance with some embodiments of the disclosure. The graphical user interface 500 may be provided by processing logic that may comprise hardware (e.g., processing device, circuitry, dedicated logic, programmable logic, microcode, etc.), software (e.g., instructions run or executed on a processing device), or a combination thereof. In some embodiments, the graphical user interface 500 may be displayed or provided by a row module 200 of a client system or of a server system. Furthermore, the graphical user interface 500 may correspond to the graphical user interface 400 after a user has selected a visual indicator in the third state in the last row of the graphical user interface 400.

As shown in FIG. 5, the graphical user interface 500 may include the rows 310 and 320 and a new row 330 that is displayed or provided in response to a selection of the visual indicator 322. For example, the row 330 may be added as an inactive or disabled row with an entry field 332 (e.g., an entry field with no assigned profile) and a visual indicator 331 in the second state (e.g., a grayed out plus sign). Furthermore, the visual indicator of the row 320 may be switched from the third state (e.g., an active plus sign) to the first state (e.g., the minus sign) in response to the adding of the row 330 by the selecting of the visual indicator of the row 320 in the second state.

As such, if a visual indicator in a third state of an existing row is selected, a new inactive row with an empty entry field and a visual indicator in a second state is added below the existing row and the visual indicator of the existing row is changed from the third state (e.g., an active plus sign) to the first state (e.g., the minus sign).

Figure 6:
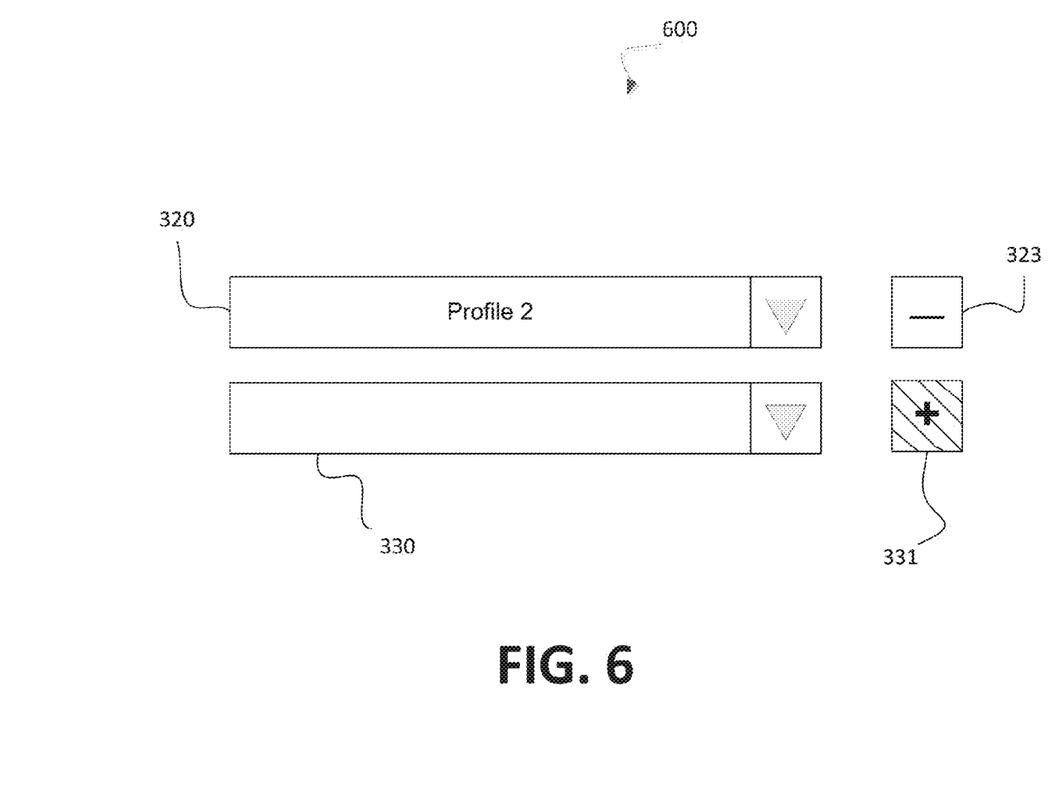
FIG. 6 is an illustrated example graphical user interface with a removed row in accordance with some embodiments.

FIG. 6 is an illustrated example graphical user interface 600 with a removed row in accordance with some embodiments. The graphical user interface 600 may be provided by processing logic that may comprise hardware (e.g., processing device, circuitry, dedicated logic, programmable logic, microcode, etc.), software (e.g., instructions run or executed on a processing device), or a combination thereof. In some embodiments, the graphical user interface 600 may be displayed or provided by a row module 200 of a client system or of a server system. Furthermore, the graphical user interface 600 may correspond to the graphical user interface 500 after a user has selected a visual indicator in the first state to remove a row of the graphical user interface 500.

As shown in FIG. 6, the graphical user interface 600 may include rows 320 and 330 and may not include row 310. For example, the row 310 may be removed after a user has selected the visual indicator (e.g., minus sign) of the row 310. In response to the removing of the row 310, the rows 320 and 330 may be moved up within the graphical user interface. For example, the row 320 may replace the position of the row 310 in the graphical user interface. Thus, when the row 310 is removed, the entry field and the visual indicator of the row 310 is removed.

As such, a graphical user interface may display one or more rows for entry or selection of an option of a drop-down menu. For example, the drop-down menu may be used to assign profiles to virtual network interfaces of a virtual machine. Each row may include a drop-down menu and a visual indicator (e.g., buttons) to the right of their respective drop-down menu. In some embodiments, the visual indicators of each row above the bottom row may display a minus sign and may be clicked on or selected by a user. In response to a user selecting a visual indicator with a minus sign, the corresponding row (e.g., the drop-down menu with a selected profile of a virtual network interface and the visual indicator) may be removed and any rows beneath the removed row may be moved up.

Furthermore, if the bottom row has no entry or selection in its drop-down menu, its visual indicator may be a plus sign that is grayed out and disabled such that a user may not select the visual indicator to perform any action. However, if the drop-down menu is assigned a profile to a virtual network interface of a virtual machine, then the visual indicator may be activated and may be a plus sign that is not grayed out and may be enabled such that the user may select the visual indicator to perform an action. For example, upon clicking or selecting the visual indicator with the active gray plus sign, a new row may be added to the graphical user interface. The new row may initially include an empty drop-down menu and its corresponding visual indicator may display a plus sign that is grayed out. Such a last row may be manipulated as the bottom row as described above.

Figure 7:
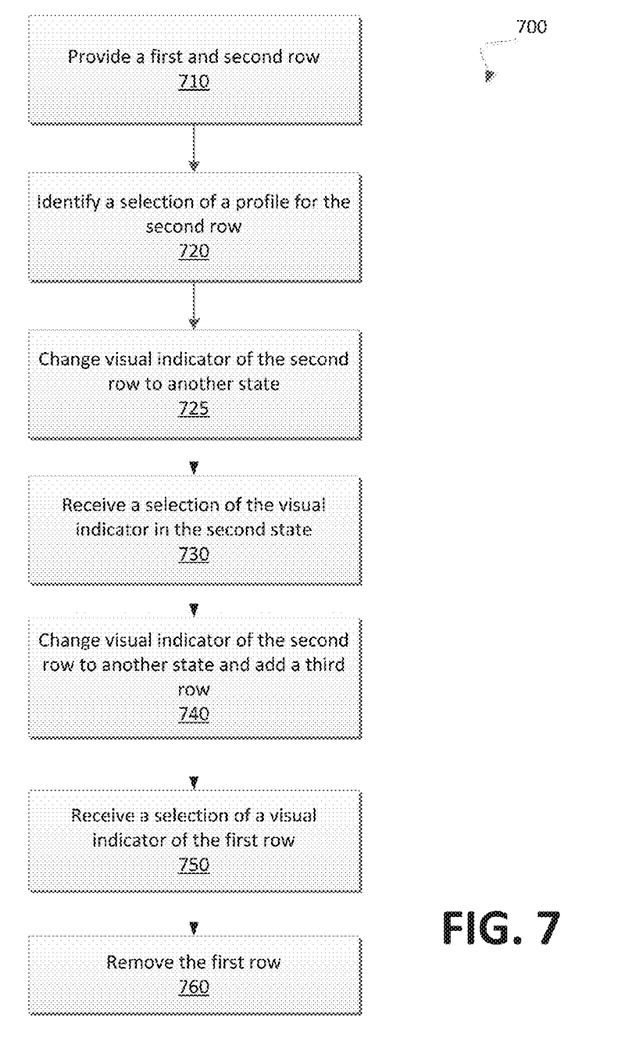
FIG. 7 is an example method to add and remove rows corresponding to properties of a virtual machine in accordance with some embodiments.

FIG. 7 is an example method 700 to add and remove rows corresponding to properties of virtual hardware resources of a virtual machine in accordance with some embodiments. The method 700 may be provided by processing logic that may comprise hardware (e.g., processing device, circuitry, dedicated logic, programmable logic, microcode, etc.), software (e.g., instructions run or executed on a processing device), or a combination thereof. In some embodiments, the method 700 may be performed by a row module 200 of a client system or of a server system.

As shown in FIG. 7, the method 700 may begin with the processing logic displaying a first and second row (block 710). In some embodiments, the first row may be activated by the selection of a profile from a drop-down menu to be assigned to a virtual network interface of a virtual machine and the second row may be disabled with no selection of a profile from a corresponding drop-down menu. Furthermore, each row may include a visual indicator as previously described. The processing logic may identify a selection of a profile from the drop-down menu of the second row (block 720). In response to the selection of the profile from the drop-down menu of the second row, the processing logic may enable or change the visual indicator of the second row to another state (e.g., from the grayed out plus sign or second state to the active plus sign or third state) (block 725). The processing logic may receive a selection of the enabled visual indicator of the second row (block 730). In response to the selection of the enabled visual indicator of the second row, the processing logic may change the visual indicator of the second row from the active plus sign to a minus sign (e.g., from the third state to the first state) and may further add a third row below the second row (block 740). In some embodiments, the third row may include an inactive drop-down menu and a visual indicator in the second state (e.g., a grayed out plus sign). Furthermore, the processing logic may receive a selection of a visual indicator of the first or second row (e.g., a visual indicator in the first state that displays the minus sign) (block 750). In response to such a selection, the processing logic may remove the row (e.g., the drop-down menu and visual indicator) corresponding to the selected visual indicator (block 760).

Figure 8:
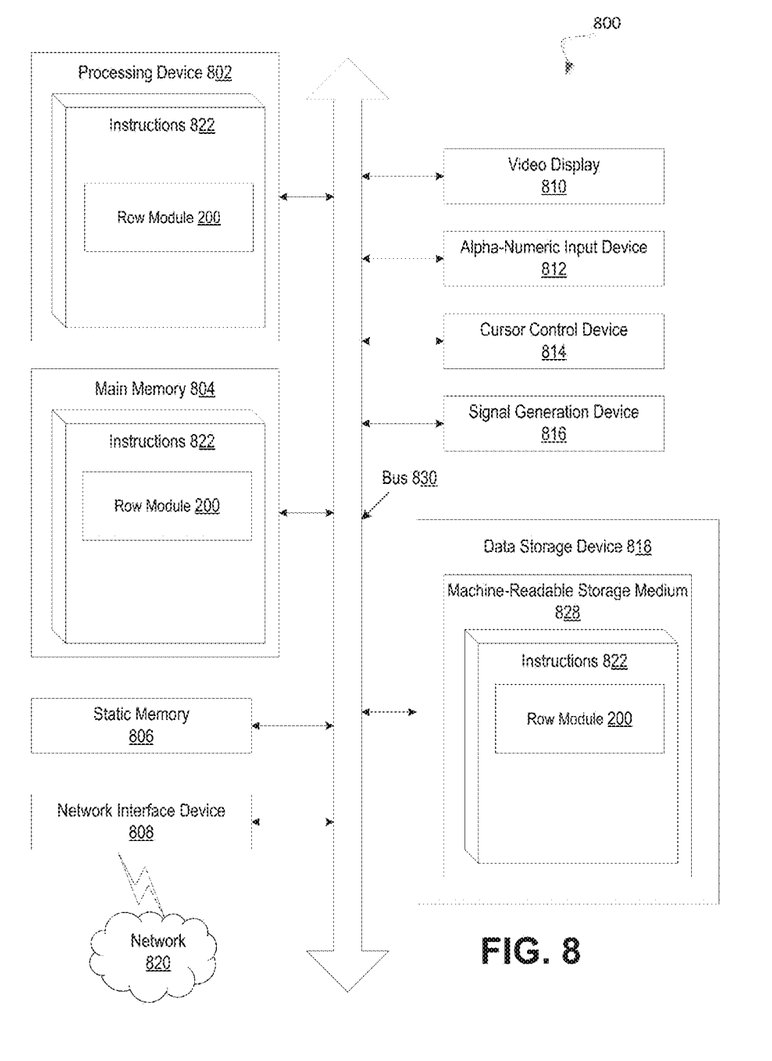
FIG. 8 illustrates a block diagram of an embodiment of a computer system in which some embodiments of the disclosure may operate.

FIG. 8 illustrates an example machine of a computer system 800 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM) or DRAM (RDRAM), etc.), a static memory 806 (e.g., flash memory, static random access memory (SRAM), etc.), and a data storage device 818, which communicate with each other via a bus 830.

Processing device 802 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute instructions 822 for performing the operations and steps discussed herein.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a machine-readable storage medium 828 (also known as a computer-readable medium) on which is stored one or more sets of instructions or software 822 embodying any one or more of the methodologies or functions described herein. The instructions 822 may also reside, completely or at least partially, within the main memory 804 and/or within the processing device 802 during execution thereof by the computer system 800, the main memory 804 and the processing device 802 also constituting machine-readable storage media.

In one implementation, the instructions 822 include instructions for a row module (e.g., row module 111 of FIG. 1 and/or row module 200 of FIG. 2) and/or a software library containing methods that call modules or sub-modules in a row module. While the machine-readable storage medium 828 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
providing, by a processing device, a graphical user interface (GUI) comprising a plurality of rows representing virtual hardware resources of a virtual machine, wherein a first row of the plurality of rows comprises a first entry field with an assigned first profile and a first visual indicator adjacent to the first entry field, and wherein a second row of the plurality of rows comprises a second entry field and a second visual indicator that is adjacent to the second entry field;
receiving a selection of the second entry field;
in response to the selection of the second entry field of the second row that represents a particular virtual hardware resource of the virtual machine, providing a menu at the second entry field in the GUI to identify a plurality of network interfaces that are available for the virtual machine, wherein each of the plurality of network interfaces corresponds to one or more settings for a type of resource available to the virtual machine;
receiving a selection of at least one of the plurality of available network interfaces to be assigned to the second entry field of the second row of the plurality of rows;
receiving a selection of the second visual indicator of the second row of the plurality of rows;
adding, by the processing device, a third row to the GUI in response to the selection of the second visual indicator that is adjacent to the second entry field after the selection of the at least one of the plurality of available network interfaces to be assigned to the second entry field of the second row of the plurality of rows, wherein the adding of the third row in response to the selection of the second visual indicator of the second row corresponds to an adding of an additional network interface to the virtual machine; and
in response to the selection of the at least one of the plurality of available network interfaces to the virtual machine, providing the selected at least one of the plurality of available network interfaces to the virtual machine.

2. The method of claim 1, further comprising:
in response to the selection of the at least one of the plurality of available network interfaces to be assigned to the second entry field, changing a state of the second visual indicator from a first state to a second state, wherein the first state is an inactive state and the second state allows the selection of the second visual indicator.

3. The method of claim 1, wherein the third row comprises a third entry field and a third visual indicator, and wherein the first visual indicator and the second visual indicator are placed in a first state in response to the adding of the third row and the third visual indicator is in a second state.

4. The method of claim 3, further comprising:
receiving a selection of the first visual indicator in the first state; and
in response to the selection of the first visual indicator in the first state, removing the first row.

5. The method of claim 1, wherein the first entry field and the second entry field is a drop down menu.

6. A system comprising:
a memory to store data associated with a graphical user interface (GUI); and
a processing device, operatively coupled with the memory, to:
provide the GUI comprising a plurality of rows representing virtual hardware resources of a virtual machine, wherein a first row of the plurality of rows comprises a first entry field with an assigned first profile and a first visual indicator adjacent to the first entry field, and wherein a second row of the plurality of rows comprises a second entry field and a second visual indicator that is adjacent to the second entry field;
receive a selection of the second entry field;
in response to the selection of the second entry field of the second row that represents a particular virtual hardware resource of the virtual machine, provide a menu at the second entry field in the GUI to identify a plurality of network interfaces that are available for the virtual machine, wherein each of the plurality of network interfaces corresponds to one or more settings for a type of resource available to the virtual machine;
receive a selection of at least one of the plurality of available network interfaces to be assigned to the second entry field of the second row of the plurality of rows;
receive a selection of the second visual indicator of the second row of the plurality of rows;
add a third row to the GUI in response to the selection of the second visual indicator that is adjacent to the second entry field after the selection of the at least one of the plurality of available network interfaces to be assigned to the second entry field of the second row of the plurality of rows, wherein the adding of the third row in response to the selection of the second visual indicator of the second row corresponds to an adding of an additional network interface to the virtual machine; and in response to the selection of the at least one of the plurality of available network interfaces to the virtual machine, provide the selected at least one of the plurality of available network interfaces to the virtual machine.

7. The system of claim 6, wherein the processing device is further to:

in response to the selection of the at least one of the plurality of available network interfaces to be assigned to the second entry field, change a state of the second visual indicator from a first state to a second state, wherein the first state is an inactive state and the second state allows the selection of the second visual indicator.

8. The system of claim 6, wherein the third row comprises a third entry field and a third visual indicator, and wherein the first visual indicator and the second visual indicator are placed in a first state in response to the adding of the third row and the third visual indicator is in a second state.

9. The system of claim 8, wherein the processing device is further to:

receive a selection of the first visual indicator in the first state; and in response to the selection of the first visual indicator in the first state, remove the first row.

10. The system of claim 6, wherein the first entry field and the second entry field is a drop down menu.

11. A non-transitory machine-readable storage medium comprising data that, when accessed by a processing device, cause the processing device to:

provide, by the processing device, a graphical user interface (GUI) comprising a plurality of rows representing virtual hardware resources of a virtual machine, wherein a first row of the plurality of rows comprises a first entry field with an assigned first profile and a first visual indicator adjacent to the first entry field, and wherein a second row of the plurality of rows comprises a second entry field and a second visual indicator that is adjacent to the second entry field;

receive a selection of the second entry field;

in response to the selection of the second entry field of the second row that represents a particular virtual hardware resource of the virtual machine, provide, by the processing device, a menu at the second entry field in the GUI to identify a plurality of network interfaces that are available for the virtual machine, wherein each of the plurality of network interfaces corresponds to one or more settings for a type of resource available to the virtual machine;

receive a selection of at least one of the plurality of available network interfaces to be assigned to the second entry field of the second row of the plurality of rows;

receive a selection of the second visual indicator of the second row of the plurality of rows;

add a third row to the GUI in response to the selection of the second visual indicator that is adjacent to the second entry field after the selection of the at least one of the plurality of available network interfaces to be assigned to the second entry field of the second row of the plurality of rows, wherein the adding of the third row in response to the selection of the second visual indicator of the second row corresponds to an adding of an additional network interface to the virtual machine; and in response to the selection of the at least one of the plurality of available network interfaces to the virtual machine, provide the selected at least one of the plurality of available network interfaces to the virtual machine.

12. The non-transitory machine-readable storage medium of claim 11, wherein the processing device is further to:

in response to the selection of the at least one of the plurality of available network interfaces to be assigned to the second entry field, change a state of the second visual indicator from a first state to a second state, wherein the first state is an inactive state and the second state allows the selection of the second visual indicator.

13. The non-transitory machine-readable storage medium of claim 11, wherein the third row comprises a third entry field and a third visual indicator, and wherein the first visual indicator and the second visual indicator are placed in a first state in response to the adding of the third row and the third visual indicator is in a second state.

14. The non-transitory machine-readable storage medium of claim 13, wherein the processing device is further to:

receive a selection of the first visual indicator in the first state; and in response to the selection of the first visual indicator in the first state, remove the first row.

\* \* \* \* \*